(12) United States Patent
Oh

(10) Patent No.: US 6,450,548 B2
(45) Date of Patent: Sep. 17, 2002

(54) STRUCTURE FOR ASSEMBLING PRESSURE PIPE TO OIL PUMP IN POWER STEERING SYSTEM

(75) Inventor: Won-Jin Oh, Kwangmyong-shi (KR)

(73) Assignee: Kia Motors Corporation, Kwangmyong-shi (KR)

( * ) Notice: Subject to any disclaimer, the term of this patent is extended or adjusted under 35 U.S.C. 154(b) by 0 days.

(21) Appl. No.: 09/734,653

(22) Filed: Dec. 13, 2000

(30) Foreign Application Priority Data

Dec. 13, 1999 (KR) .......................................... 99-57282

(51) Int. Cl.⁷ .................................................. F16L 27/00
(52) U.S. Cl. .......................... 285/190; 285/272; 285/98
(58) Field of Search ................................ 285/190, 273, 285/272, 98

(56) References Cited

U.S. PATENT DOCUMENTS

| | | |
|---|---|---|
| 4,678,052 A | 7/1987 | Suzuki et al. |
| 4,896,737 A | 1/1990 | Kanazawa et al. |
| 5,072,585 A | 12/1991 | Fassbender et al. |
| 5,152,359 A | 10/1992 | Emori et al. |
| 5,289,681 A | 3/1994 | Iwata |
| 5,713,609 A * | 2/1998 | Mascola ................... 285/190 |
| 5,780,731 A | 7/1998 | Matsui et al. |
| 5,803,360 A * | 9/1998 | Spitznagel ................. 285/190 |
| 6,030,187 A | 2/2000 | Whitefield et al. |

FOREIGN PATENT DOCUMENTS

| | | | | |
|---|---|---|---|---|
| AT | 0097474 | * | 7/1924 | ................. 285/190 |
| DE | 0325593 | * | 9/1920 | ................. 285/190 |
| DE | 00394453 | * | 9/1965 | ................. 285/190 |
| FR | 1362559 | * | 4/1964 | ................. 285/190 |

* cited by examiner

Primary Examiner—Lynne H. Browne
Assistant Examiner—Aaron M. Dunwood
(74) Attorney, Agent, or Firm—Birch, Stewart, Kolasch & Birch, LLP

(57) ABSTRACT

Disclosed is a structure for assembling a pressure pipe to an oil pump in a power steering system, for allowing the pressure pipe to guide oil discharged from the oil pump to a power boosting mechanism. The structure comprises a cylindrical connector arranged on an upper end surface of a pump body possessing a discharging port, the cylindrical connector being defined with a hollow portion which is aligned with the discharging port and a communicating hole which extends in a radial direction from a circumferential outer surface of the cylindrical connector to the hollow portion; an eye connector integrally formed with an end of a pressure pipe, the eye connector being fitted around the cylindrical connector in a manner such that the eye connector aligns the pressure pipe and the hollow portion of the cylindrical connector with each other; a cap nut threadedly coupled around an upper portion of the cylindrical connector to fasten the eye connector; and a pair of copper washers fitted around the eye connector in such a way as to be placed on upper and lower ends of the eye connector so that airtightness is maintained between the cylindrical connector and the eye connector.

1 Claim, 3 Drawing Sheets

STRUCTURE FOR ASSEMBLING PRESSURE PIPE TO OIL PUMP IN POWER STEERING SYSTEM

BACKGROUND OF THE INVENTION

1. Field of the Invention

The present invention relates to a power steering system for a motor vehicle, and more particularly, the present invention relates to a structure for assembling a pressure pipe to an oil pump in a power steering system, with the pressure pipe functioning to guide oil discharged from the oil pump to a power boosting mechanism.

2. Description of the Related Art

A steering apparatus of a motor vehicle serves to change a running direction of the motor vehicle in obedience to the desire of the driver. Steering torque, exerted by the driver to a steering handle, is transferred from a manipulating mechanism through a gear mechanism, and through a link mechanism to the wheels of the motor vehicle.

These days, power steering systems have been widely used throughout the world, wherein steering torque, exerted to a steering handle by a driver, to be transferred from a manipulation mechanism to a gear mechanism, is boosted using a power boosting mechanism actuated by hydraulic pressure, in a manner such that the driver can easily and quickly implement steering manipulation with markedly reduced driver steering effort.

In the power steering system, the hydraulic pressure for actuating the power boosting mechanism is generating by an oil pump, which is driven by an engine, and is transmitted through a pressure pipe to the power boosting mechanism.

FIG. 1 is a perspective view illustrating a conventional structure for assembling a pressure pipe to an oil pump in a power steering system.

The oil pump has a pump body 1. A base 2 is centrally affixed to an upper end surface of the pump body 1. A discharging port which is defined in the pump body 1, extends up to an upper end of the base 2. A cylindrical connector 3 is secured to the base 2 in a manner such that the cylindrical connector 3 extends upward from the upper end of the base 2. The cylindrical connector 3 is defined with a hollow portion which is aligned with the discharging port of the pump body 1. A communicating hole 5 is radially defined through a wall of the cylindrical connector 3. The hollow portion is aligned with the outside through the communicating hole 5. The cylindrical connector 3 is formed on a circumferential outer surface thereof, and adjacent to an upper end thereof, with an externally-threaded portion 6.

An eye connector 8 is integrally formed with an end of a pressure pipe 7. The eye connector 8 is fitted around the cylindrical connector 3 in a manner such that the eye connector 8 aligns the communicating hole 5 and the pressure pipe 7 with each other. A pair of O-rings 12 are placed on upper and lower ends, respectively, of the eye connector 8 which is fitted around the cylindrical connector 3, so as to prevent oil from leaking between the cylindrical connector 3 and the eye connector 8. The pair of O-rings 12 are made of a material having a predetermined elasticity, such as rubber. Because a cap nut 11 is threadedly coupled to the externally-threaded portion 6 of the cylindrical connector 3, the eye connector 8 is rigidly fastened to the cylindrical connector 3.

Oil, discharged through the discharging port from the pump body 1, flows through the hollow portion, the communicating hole 5 and the eye connector 8, into the pressure pipe 7, and then, is guided through the pressure pipe 7 to a power boosting mechanism.

FIG. 2 is a perspective view illustrating another conventional structure for assembling a pressure pipe to an oil pump in a power steering system.

The oil pump has a pump body 1. A base 2 is centrally affixed to an upper end surface of the pump body 1. A discharging port 4 which is defined in the pump body 1, extends to an upper end of the base 2. A hollow bolt 15 which has a hollow portion opened at a lower end thereof, is threadedly coupled to the base 2 in a manner such that the hollow portion is aligned with the discharging port 4. A communicating hole 5 is radially defined through a wall of the hollow bolt 15. The hollow portion of the hollow bolt 15 is aligned with the outside through the communicating hole 5.

An eye connector 8 is fitted around the hollow bolt 15 in a manner such that the hollow bolt 15 is threadedly coupled through the eye connector 8 to the base 2. The eye connector 8 is integrally formed with an end of a pressure pipe 7. A pair of washers 17 made of copper are placed on upper and lower ends, respectively, of the eye connector 8 which is fitted around the hollow bolt 15, so as to prevent oil from leaking between the hollow bolt 15 and the eye connector 8.

However, the conventional structures for assembling the pressure pipes to the oil pumps, constructed as mentioned above, suffer from defects as described below. That is, in the case that the pressure pipe 7 is assembled to the oil pump in a state wherein the eye connector 8 is not brought into precise close contact with respect to the base 2, the likelihood of the O-rings and the washers 17 being broken, is increased.

That is to say, in the structure shown in FIG. 1, if the pressure pipe 7 is assembled to the oil pump in a state wherein a lower surface of the eye connector 8 is not brought into precise close contact with respect to an upper surface of the base 2, the coupling force of the cap nut 11 is unevenly transferred to the O-rings 12, and thereby, the O-rings can be deformed or broken to cause oil leakage.

Also, in the structure shown in FIG. 2, if the pressure pipe 7 is assembled to the oil pump in a state wherein a lower surface of the eye connector 8 is not brought into precise close contact with respect to an upper surface of the base 2, the hollow bolt 15 which is threadedly coupled through the eye connector 8 to the base 2, is lop-sidedly positioned with respect to the base 2. By this, screw threads of the hollow bolt 15 and the base 2 can be worn or broken. In this case, the entire oil pump must be replaced with a new one. Further, since the coupling force of the hollow bolt 15 is unevenly transferred to the washers 17, the washers 17 can be broken to cause oil leakage.

SUMMARY OF THE INVENTION

Accordingly, the present invention has been made in an effort to solve the problems occurring in the related art, and an object of the present invention is to provide a structure for assembling a pressure pipe to an oil pump in a power steering system, which can reliably prevent oil from leaking even when the pressure pipe is assembled to the oil pump in a state wherein an eye connector is not brought into precise close contact with respect to a base.

In order to achieve the above object, according to the present invention, there is provided a structure for assembling a pressure pipe to an oil pump in a power steering system, for allowing the pressure pipe to guide oil discharged from the oil pump to a power boosting mechanism, comprising: a cylindrical connector arranged on an upper end surface of a pump body possessing a discharging port, the cylindrical connector being defined with a hollow portion which is aligned with the discharging port and a communicating hole which extends in a radial direction from a circumferential outer surface of the cylindrical connector to the hollow portion; an eye connector integrally formed with an end of a pressure pipe, the eye connector being fitted around the cylindrical connector in a manner such that the eye connector aligns the pressure pipe and the hollow portion of the cylindrical connector with each other; a cap nut threadedly coupled around an upper portion of the cylindrical connector to fasten the eye connector; and a pair of copper washers fitted around the eye connector in such a way as to be placed on upper and lower ends of the eye connector so that airtightness is maintained between the cylindrical connector and the eye connector.

BRIEF DESCRIPTION OF THE DRAWINGS

The above objects, and other features and advantages of the present invention will become more apparent after a reading of the following detailed description, when taken in conjunction with the drawings, in which.

DETAILED DESCRIPTION OF PREFERRED EMBODIMENTS

Figure 1:
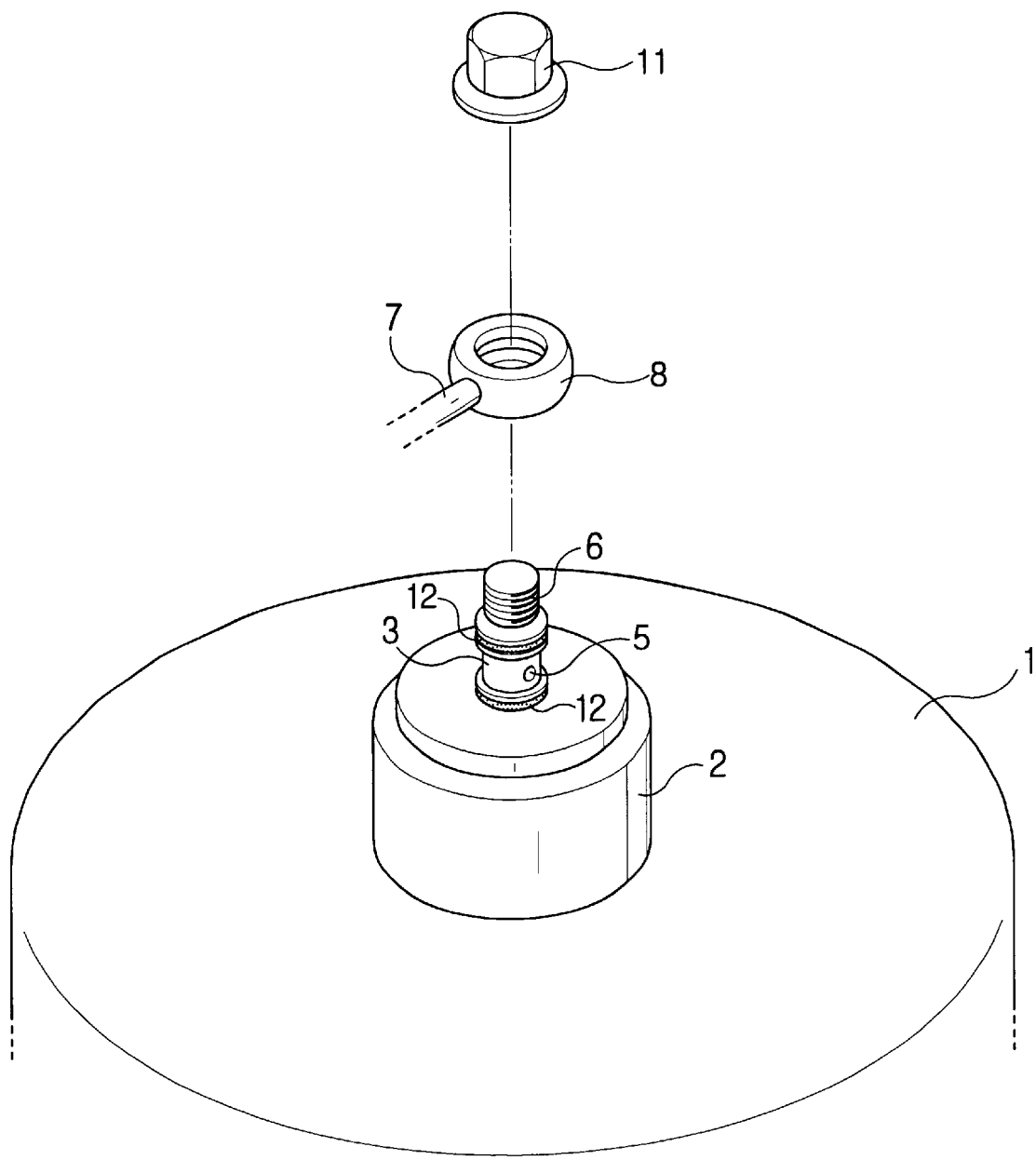
FIG. 1 is a perspective view illustrating a conventional structure for assembling a pressure pipe to an oil pump in a power steering system.
Figure 2:
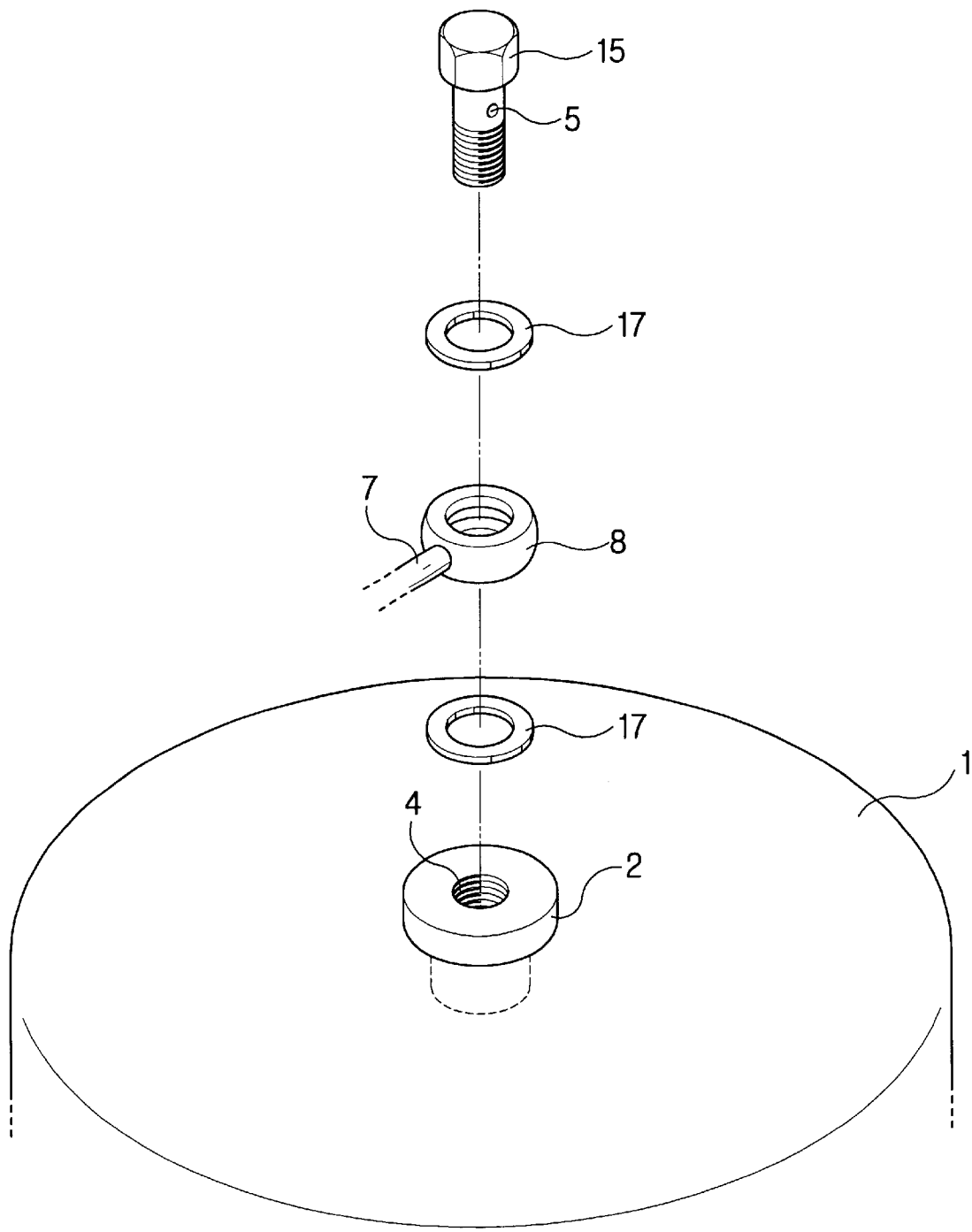
FIG. 2 is a perspective view illustrating another conventional structure for assembling a pressure pipe to an oil pump in a power steering system.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
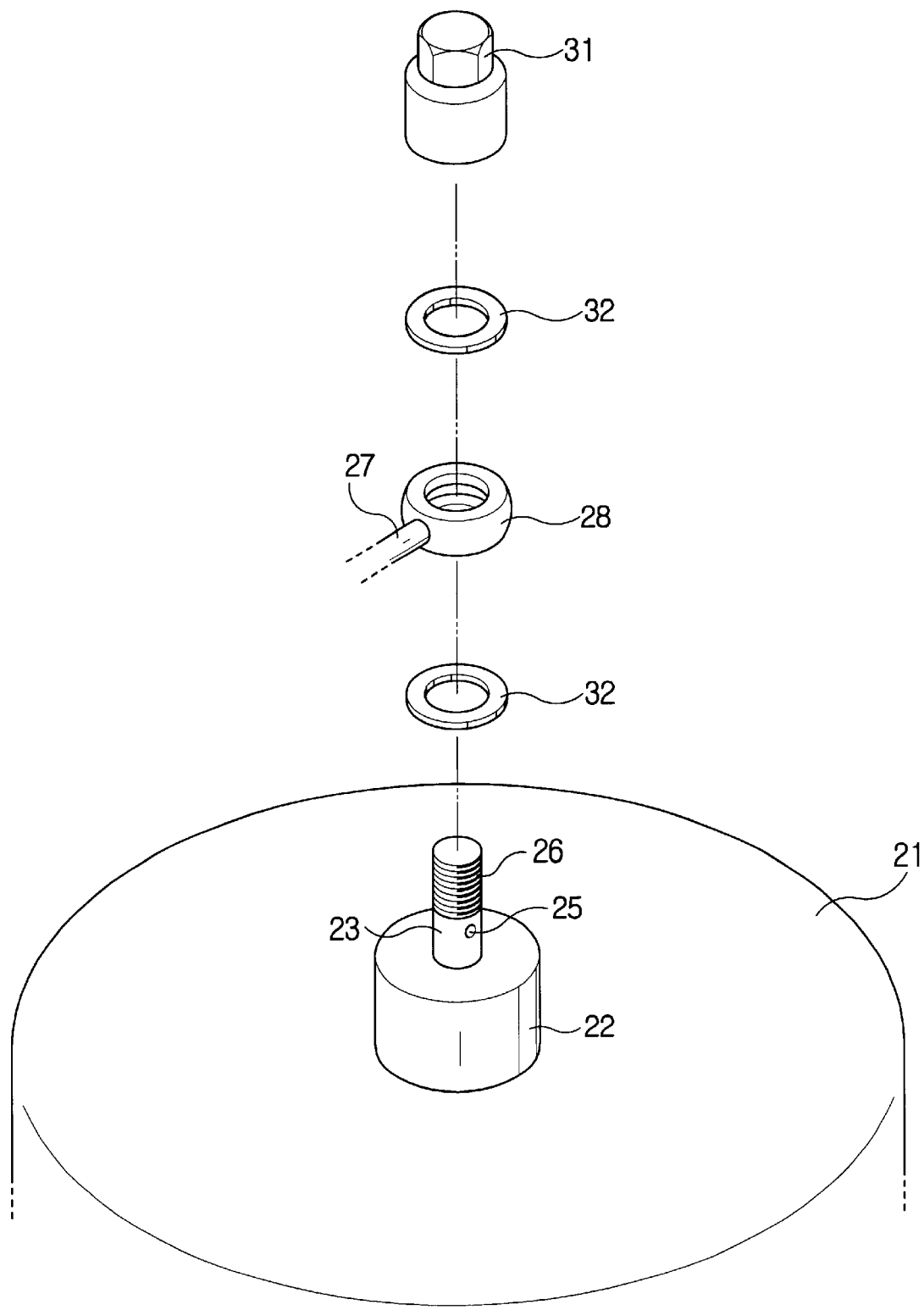
FIG. 3 is a perspective view illustrating a structure for assembling a pressure pipe to an oil pump in a power steering system, in accordance with an embodiment of the present invention.

FIG. 3 is a perspective view illustrating a structure for assembling a pressure pipe to an oil pump in a power steering system, in accordance with an embodiment of the present invention.

The oil pump has a pump body 21. A base 22 is centrally affixed to an upper end surface of the pump body 21. A discharging port which is defined in the pump body 21, extends to an upper end of the base 22. A cylindrical connector 23 is secured to the base 22 in a manner such that the cylindrical connector 23 extends upward from the upper end of the base 22. The cylindrical connector 23 is defined with a hollow portion which is aligned with the discharging port of the pump body 21. A communicating hole 25 is radially defined through a wall of the cylindrical connector 23 to extend from a circumferential outer surface to the hollow portion of the cylindrical connector 23. Therefore, the hollow portion is aligned with the outside through the communicating hole 25. The cylindrical connector 23 is formed, on a circumferential outer surface thereof and adjacent to an upper end thereof, with an externally-threaded portion 26.

An eye connector 28 is integrally formed with an end of a pressure pipe 27. The eye connector 28 is fitted around the cylindrical connector 23 in a manner such that the eye connector 28 aligns the communicating hole 25 of the cylindrical connector 23 and the pressure pipe 27 with each other. A pair of washers 32 are placed on upper and lower ends, respectively, of the eye connector 28 which is fitted around the cylindrical connector 23, so as to prevent oil from leaking between the cylindrical connector 23 and the eye connector 28. The pair of washers 32 are made of copper. A cap nut 31 is threadedly coupled to the externally-threaded portion 26 of the cylindrical connector 23, and by this, the eye connector 28 is rigidly fastened to the cylindrical connector 23.

As described above, in the structure for assembling a pressure pipe to an oil pump in a power steering system, according to the present invention, the eye connector 28 is fitted around the cylindrical connector 23, the cap nut 31 is threadedly coupled to the cylindrical connector 23, and the pair of washers 32 are used to maintain airtightness between the cylindrical connector 23 and the eye connector 28. Consequently, even though the cap nut 31 is threadedly coupled to the cylindrical connector 23 in a state wherein the eye connector 28 is not brought into precise close contact with respect to an upper surface of the base 22, since screw threads of the cap nut 31 and cylindrical connector 23 are precisely meshed with each other, coupling force of the cap nut 31, which is transferred to the pair of washers 32, is evenly distributed over entire surfaces of the washers 32. As a result, it is possible to prevent the screw threads of the cap nut 31 and cylindrical connector 23 from being worn or broken, and oil leakage which can be otherwise caused due to breakage of the washers 31, is avoided.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A structure for assembling a pressure pipe to an oil pump in a power steering system, for allowing the pressure pipe to guide oil discharged from the oil pump to a power boosting mechanism, comprising:

a cylindrical connector arranged on an upper end surface of a pump body possessing a discharging port, the cylindrical connector being defined with a hollow portion which is aligned with and connected downstream of the discharging port and a communicating hole which extends in a radial direction from a circumferential outer surface of the cylindrical connector to the hollow portion;

an eye connector integrally formed with an end of a pressure pipe, the eye connector being fitted around the cylindrical connector in a manner such that the eye connector aligns the pressure pipe and the hollow portion of the cylindrical connector with each other;

a cap nut, having a hex-head portion and a flange portion, the flange portion having a diameter approximately equal to the diameter of the eye portion, and a height approximately equal to said diameter, threadedly coupled around an upper portion of the cylindrical connector to fasten the eye connector; and a pair of copper washers fitted around the eye connector in such a way as to be placed on upper and lower ends of the eye connector so that airtightness is maintained between the cylindrical connector and the eye connector.

* * * * *